United States Patent
Akae et al.

(10) Patent No.: US 10,042,816 B2
(45) Date of Patent: Aug. 7, 2018

(54) TABLE GENERATING APPARATUS, TABLE GENERATING METHOD AND RECORDING MEDIUM CONTAINING PROGRAM

(71) Applicant: CASIO COMPUTER CO., LTD., Shibuya-ku, Tokyo (JP)

(72) Inventors: Naoki Akae, Fussa (JP); Saburo Kamitani, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 219 days.

(21) Appl. No.: 14/836,728

(22) Filed: Aug. 26, 2015

(65) Prior Publication Data

US 2016/0078000 A1    Mar. 17, 2016

(30) Foreign Application Priority Data

Sep. 17, 2014 (JP) .................................. 2014-189023

(51) Int. Cl.
*G06F 17/30* (2006.01)
*G06F 17/11* (2006.01)
*G06F 15/02* (2006.01)

(52) U.S. Cl.
CPC .......... *G06F 17/11* (2013.01); *G06F 15/0225* (2013.01); *G06F 17/30994* (2013.01)

(58) Field of Classification Search
CPC ...................................................... G06F 17/11
See application file for complete search history.

(56) References Cited

U.S. PATENT DOCUMENTS 8,749,553 B1 *  6/2014  Krasovsky ............ G06T 11/203
345/440

FOREIGN PATENT DOCUMENTS

JP          09134331 A     5/1997
JP       2006309619 A    11/2006

OTHER PUBLICATIONS

TI-89, Introduction to TI-89, Feb. 2000 <http://courses.wccnet.edu/~palay/math169/ti89_tbl.htm>.*
Youtube.com, Graphing and table function on the TI-89, Apr. 2012 <https://www.youtube.com/watch?v=43HH7KbqAZo>.*

(Continued)

*Primary Examiner* — Syed H Hasan
(74) *Attorney, Agent, or Firm* — Holtz, Holtz & Volek PC (57) ABSTRACT

A table generating apparatus includes a display unit and a processor which performs the following processes of: receiving an input of a function expression; receiving an input for setting a table range; generating a table representing a relation between a plurality of values in the range and their corresponding values determined by the function expression based on the table range, displaying the generated table on the display unit; receiving an input of an additional value while the table is displayed; adding the received additional value and its corresponding value determined by the function expression to the displayed table; and expanding the table by adding values obtained by subsequently changing the additional value and their corresponding values determined by the function expression to the displayed table, after the table addition function adds the additional value and its corresponding value to the table, each time an operation input is received.

12 Claims, 7 Drawing Sheets

(56) References Cited

OTHER PUBLICATIONS

Casioeducation.com, Graphing Calculator Comparison Activities, Jun. 2013 <https://web.archive.org/web/20130626122630/http://www.casioeducation.com/resource/pdfs/graphing_activities.pdf>.*
"I Understand Now! Office 2000", Nikkei Business Publications Soft Press, May 1, 1999: p. 83.
Japanese Office Action (and English translation thereof) dated Sep. 20, 2016, issued in counterpart Japanese Application No. 2014-189023.
Gakken Computer Editorial DPT, "Excel Reduction of Working Hours: Work + Function 250 Taugu", Gakken Publishing, May 1, 2014: p. 24-25.
Extended European Search Report (EESR) dated Dec. 22, 2017 issued in counterpart European Application No. 15183872.9.
Casio, "CFX-9970G Manual—Chapter 15 Table & Graph", May 7, 2004 (May 7, 2004), XP055432687, Retrieved from the Internet: URL:http://support.casio.com/storage/en/manual/pdf/EN/004/cfx9970_chapter15_EN.pdf.
Casio, "Graphing Calculator Comparison Activities", Apr. 20, 2009 (Apr. 20, 2009), XP055432742, Retrieved from the Internet: URL:http://www.casioeducation.com/resource /pdfs/graphing_activities.pdf.
Mifflin Houghton, "Guide for Texas Instruments TI-83, TI-83 Plus, or TI-84 Plus Graphing Calculator", Aug. 7, 2007, URL:http://college.cengage.com/mathematics/latorre/calculus_concepts/4e/assets/students/gcp/latorre_4e_grcalcguide.pdf.
University of Houston:, "Appendix A—Using a Graphing Calculator Section 2: Tables and Graphs", Aug. 10, 2011, Retrieved from the Internet: URL:https://online.math.uh.edu/Math1314-unpaid/Appendix_A/sA2/Appendix_A_Sec_2.pdf.

* cited by examiner

KEY INPUT      DISPLAY

KEY INPUT      DISPLAY

[=]

```
Table Range
 Start :
 End :
 Step :
```

FIG. 5C

KEY INPUT      DISPLAY

[1][↓][5][↓][1]

```
Table Range
 Start : 1
 End : 5
 Step : 1
```

FIG. 5D

KEY INPUT      DISPLAY   50

[=]

|   | x | f(x) |
|---|---|------|
| 1 | 1 | 3 |
| 2 | 2 | 5 |
| 3 | 3 | 7 |
| 4 | 4 | 9 |

KEY INPUT      DISPLAY

[↓][↓][↓][↓][↓]

|   | x | f(x) |
|---|---|------|
| 3 | 3 | 7 |
| 4 | 4 | 9 |
| 5 | 5 | 11 |
| 6 |   |   |

FIG. 6A

KEY INPUT

[1] [0]

DISPLAY

| x | | f(x) |
|---|---|---|
| 3 | 3 | 7 |
| 4 | 4 | 9 |
| 5 | 5 | 11 |
| 6 | | |

KEY INPUT

[=]

DISPLAY

| x | | f(x) |
|---|---|---|
| 4 | 4 | 9 |
| 5 | 5 | 11 |
| 6 | 10 | 21 |
| 7 | | |

FIG. 6C

KEY INPUT

[+] OR [=]

DISPLAY

| x | | f(x) |
|---|---|---|
| 5 | 5 | 11 |
| 6 | 10 | 21 |
| 7 | 11 | 23 |
| 8 | | |

FIG. 6D

KEY INPUT

[+] OR [=]

DISPLAY

| x | | f(x) |
|---|---|---|
| 6 | 10 | 21 |
| 7 | 11 | 23 |
| 8 | 12 | 25 |
| 9 | | |

FIG. 7A

KEY INPUT          DISPLAY

[1][0]

|  | x | f(x) |
|---|---|---|
| 3 | 3 | 7 |
| 4 | 4 | 9 |
| 5 | 5 | 11 |
| 6 | | |

KEY INPUT          DISPLAY

[=]

|  | x | f(x) |
|---|---|---|
| 4 | 4 | 9 |
| 5 | 5 | 11 |
| 6 | 10 | 21 |
| 7 | | |

FIG. 7C

KEY INPUT          DISPLAY

[−]

|  | x | f(x) |
|---|---|---|
| 5 | 5 | 11 |
| 6 | 10 | 21 |
| 7 | 9 | 19 |
| 8 | | |

FIG. 7D

KEY INPUT          DISPLAY

[−]

|  | x | f(x) |
|---|---|---|
| 6 | 10 | 21 |
| 7 | 9 | 19 |
| 8 | 8 | 17 |
| 9 | | |

FIG. 8A

DISPLAY

|   | x | f(x) |
|---|---|------|
| 1 | 1 | 3    |
| 2 | 2 | 5    |
| 3 | 3 | 7    |
| 4 | 4 | 9    |

FIG. 8B

KEY INPUT

[1][0][0][=]

DISPLAY

|   | x   | f(x) |
|---|-----|------|
| 1 | 100 | 201  |
| 2 | 2   | 5    |
| 3 | 3   | 7    |
| 4 | 4   | 9    |

FIG. 8C

KEY INPUT

[−]

DISPLAY

|   | x   | f(x) |
|---|-----|------|
| 1 | 100 | 201  |
| 2 | 99  | 199  |
| 3 | 3   | 7    |
| 4 | 4   | 9    |

FIG. 8D

KEY INPUT

[−]

DISPLAY

|   | x   | f(x) |
|---|-----|------|
| 1 | 100 | 201  |
| 2 | 99  | 199  |
| 3 | 98  | 197  |
| 4 | 4   | 9    |

TABLE GENERATING APPARATUS, TABLE GENERATING METHOD AND RECORDING MEDIUM CONTAINING PROGRAM

CROSS-REFERENCE TO RELATED APPLICATION

This application claims priority based on Japanese Patent Application No. 2014-189023, filed on Sep. 17, 2014, the entire contents of which are incorporated by reference herein.

BACKGROUND OF THE INVENTION

Field of the Invention

The present invention relates to a table generating apparatus and a table generating method and a recording medium containing a program.

Description of the Related Art

There are table generating apparatus having a function of electronically generating tables, such as scientific calculators. The table generating apparatus are used for the purposes of learning to understand or analyze the features of functions, for example, analyzing of feature points, such as the extreme values of graphs which are determined by functions, and the intersection of each graph with an x coordinate axis or a y coordinate axis. For example, Patent Document 1 (JP-A-H09-134331) discloses a graph display device for generating a numerical table representing the relation between x and y while tracing a graph which is determined by a function expression "y=f(x)".

In general, many functions and graphs representing those functions each have a plurality of feature points. For this reason, in order to efficiently analyze a function or a graph, it is desired to generate a table of a plurality of different ranges, not a table of one range. Also, in a case where the feature points of a function or a graph are not included in a table range set for the first time, in order to examine the features of the surroundings of the already set range, it is desired to easily widen the table range.

However, table generating apparatus such as scientific calculators according to the related art are for generating a table of one range, and are difficult to generate a table of a plurality of different ranges. Also, after a range is set and a table is generated, in order to add another range to the generated table, it is required to return to a range setting screen and perform resetting. For this reason, there is a problem in which it is inconvenient.

The present invention was made to solve the above described problems, and an object of the present invention is to provide a table generating apparatus, a table generating method, and a non-transitory recording medium containing a program capable of easily widening a table range.

A table generating apparatus of the present invention includes a display unit and a processor. The processor performs following processes of: a function-expression input receiving function of receiving an input of a function expression; a setting-input receiving function of receiving an input for setting a table range; a table displaying function of (i) generating a table representing a relation between a plurality of values included in the table range and corresponding values which correspond to the plurality of values respectively and which are determined by the function expression, based on the table range represented by the setting input received by the setting-input receiving function, and (ii) displaying the generated table on the display unit; an additional-value input receiving function of receiving an input of an additional value while the table displaying function is displaying the table; a table addition function of adding the additional value represented by the input received by the additional-value input receiving function and a corresponding value which corresponds to the additional value and which is determined by the function expression, to the table which the table displaying function is displaying; and a table expanding function of expanding the table by adding values obtained by subsequently changing the additional value, and corresponding values which correspond to the obtained values and which are determined by the function expression, to the table which the table displaying function is displaying, after the table addition function adds the additional value and the corresponding value thereof to the table, each time a predetermined operation input is received.

According to the present invention, it is possible to easily widen a table range.

DETAILED DESCRIPTION OF THE INVENTION

Hereinafter, an embodiment of the present invention will be described with reference to the accompanying drawings. Also, throughout the drawings, parts identical or corresponding to each other are denoted by the same reference symbols.

Figure 1:
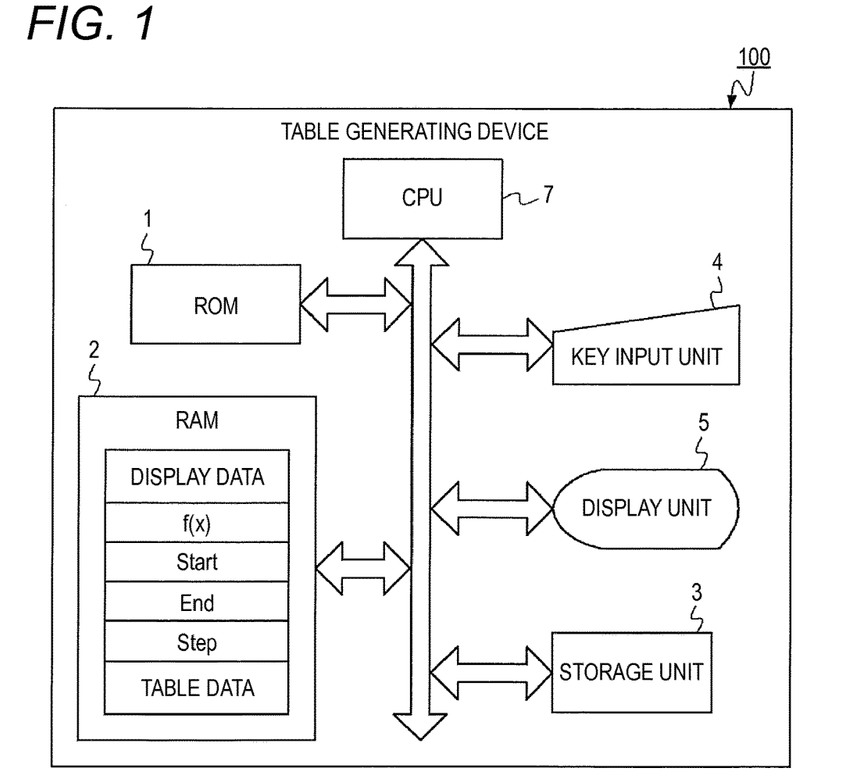
FIG. 1 is a block diagram illustrating the physical configuration of a table generating apparatus according to an embodiment of the present invention.

The present embodiment will be described taking a scientific calculator having a numerical-table generating function as an example of a table generating apparatus. Physically, the table generating apparatus according to the present embodiment is configured as shown in FIG. 1. A table generating apparatus 100 includes a read only memory (ROM) 1, a random access memory (RAM) 2, a storage unit 3, a key input unit 4, a display unit 5, and a central processing unit (CPU) 7.

The ROM 1 stores various initial settings and initial programs for performing hardware inspection, program loading, and so on. The RAM 2 temporarily stores various software programs to be executed by the CPU 7, data necessary for executing those software programs, and so on.

Specifically, the RAM 2 has storage areas for storing individual data items such as display data to be displayed on the display unit 5, functions "f(x)" which are objects of table generation, the lower limit values "Start" of table ranges, the upper limit values "End" of table ranges, step values "Step", and generated numerical-table data.

The storage unit 3 includes a non-volatile memory such as a flash memory. The storage unit 3 stores a variety of software programs and data necessary for performing various processes, a variety of data generated by the table generating apparatus 100, and so on.

The key input unit 4 has various keys for operating the table generating apparatus 100. Specifically, the key input unit 4 has cursor keys for instructing movement of a cursor up, down, left, or right, keys for inputting numbers "0" to "9", "+", "−", "×", and "÷" keys for instructing addition, subtraction, multiplication, and division, a "=" key for instructing determination (decision) of input keys, and so on. If the user presses keys, the key input unit 4 transmits information on the pressed keys to the CPU 7.

The display unit 5 has a display screen such as a liquid crystal display. The display unit 5 displays text data output by the CPU 7, on the display screen. The display unit 5 displays tables generated by table generating apparatus 100.

The CPU 7 is connected to individual units of the table generating apparatus 100 through a system bus which is a transmission path for transmitting commands and data, and controls the whole of the table generating apparatus 100.

Figure 2:
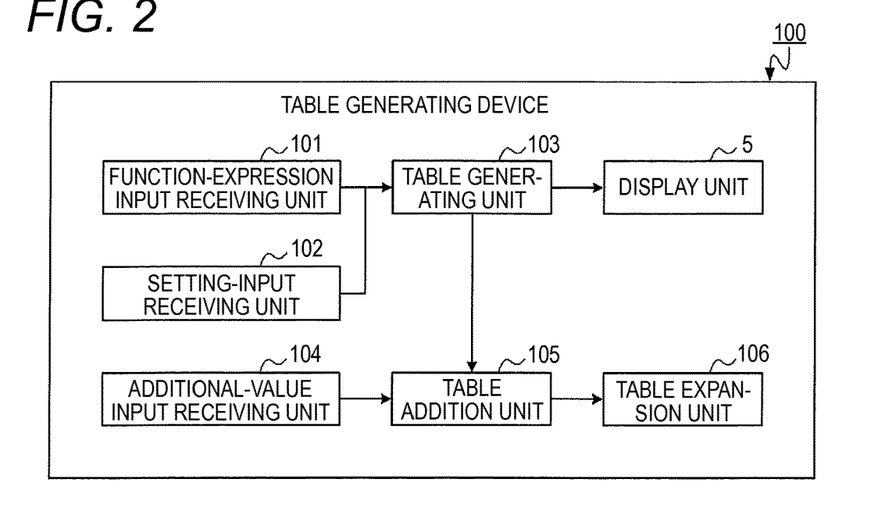
FIG. 2 is a block diagram illustrating the functional configuration of the table generating apparatus according to the embodiment of the present invention.

Functionally, the table generating apparatus 100 is configured as shown in FIG. 2. The table generating apparatus 100 includes a function-expression input receiving unit 101, a setting-input receiving unit 102, a table generating unit 103, an additional-value input receiving unit 104, a table addition unit 105, and a table expansion unit 106. The CPU 7 loads the software programs stored in the ROM 1 into the RAM 2, and executes those software programs, thereby acting as those individual units.

Hereinafter, details of the individual functional components of the table generating apparatus 100 will be described with reference to the flow charts shown in FIGS. 3 and 4, key inputs shown in FIGS. 5 to 8, and the display contents of the display unit 5 according to those key inputs.

Figure 3:
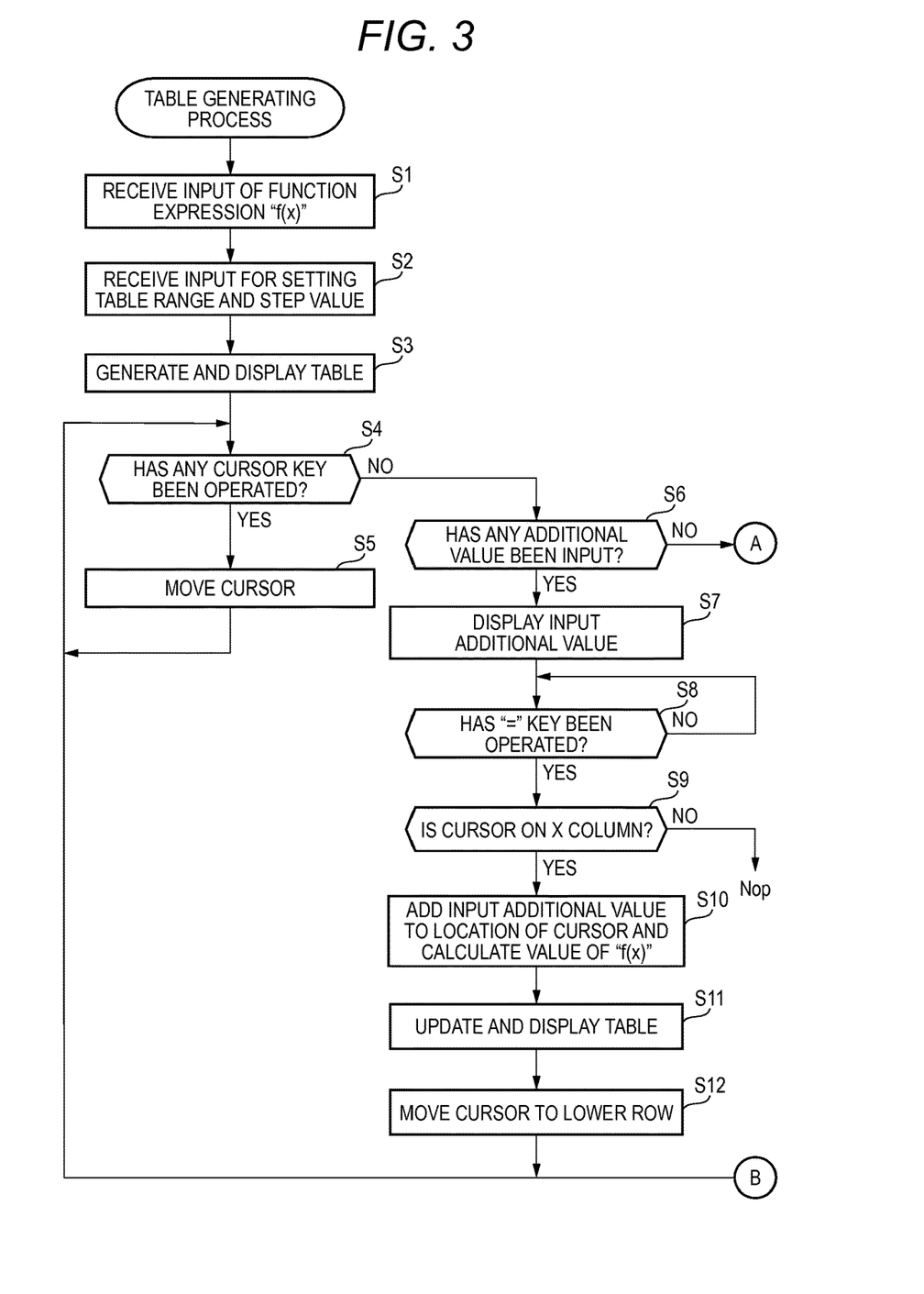
FIG. 3 is a first flow chart illustrating the flow of a table generating process of the table generating apparatus according to the embodiment of the present invention.
Figure 4:
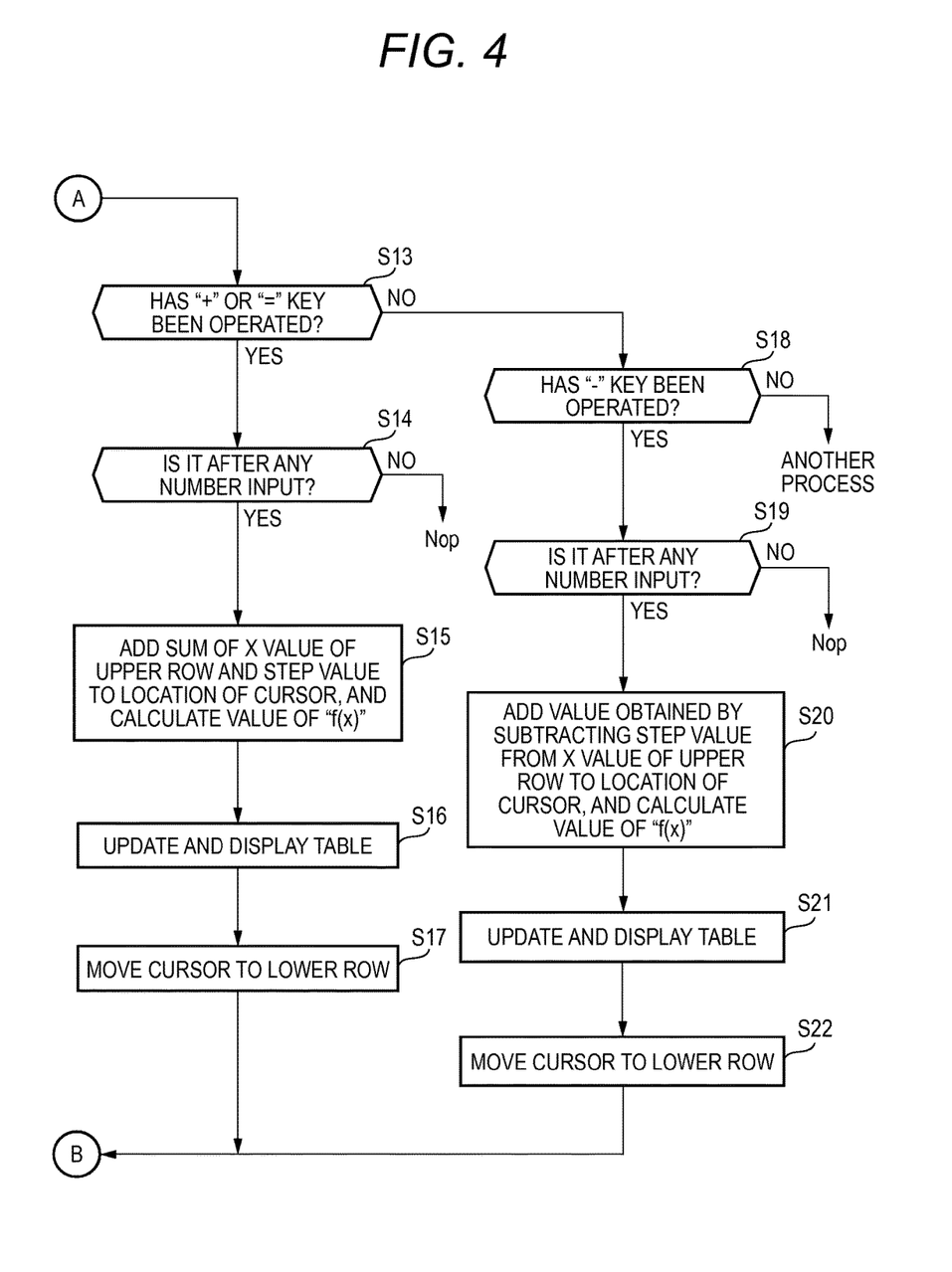
FIG. 4 is a second flow chart illustrating the flow of the table generating process of the table generating apparatus according to the embodiment of the present invention.

If a user powers up the table generating apparatus 100, and calls a function expression input screen in order to generate a table (a numerical table) on a desired function expression, a table generating process shown by the flow chart of FIG. 3 starts.

If the table generating process starts, in STEP 51, the function-expression input receiving unit 101 receives an input of a function expression "f(x)". That is, the function-expression input receiving unit 101 displays the function expression input screen on the display unit 5. If the user inputs a desired function expression using the key input unit 4 in order to generate a table, the function-expression input receiving unit 101 receives that input.

Figures 5A, 5B:
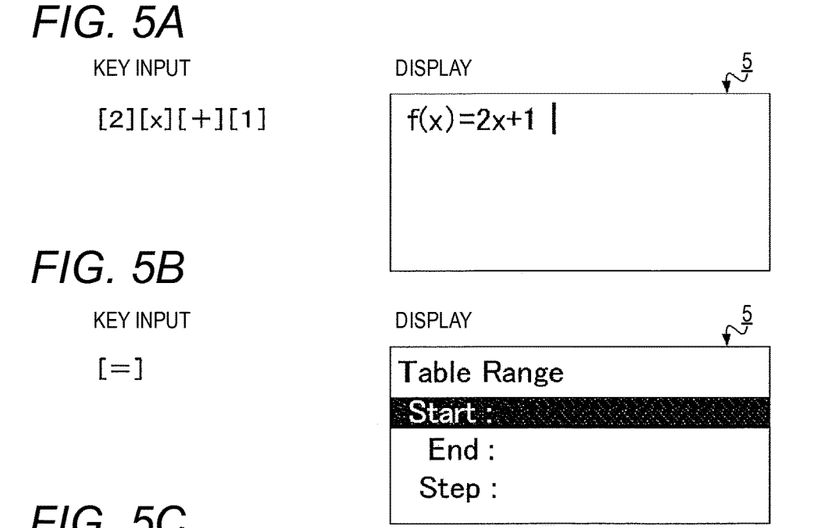
FIGS. 5A to 5E are views illustrating key inputs and the display contents of a display unit according to the key inputs.

Specifically, as shown in FIG. 5A, in order to input a function expression "f(x)=2x+1", the user presses "2", "x", "+", and "1" keys of the key input unit 4 in that order, wherein the "x" key is for inputting a variable "x". As a result, the function-expression input receiving unit 101 displays the input result "f(x)=2x+1" according to the received key input, on the display unit 5.

If the input of the function expression "f(x)" is received, in STEP S2, the setting-input receiving unit 102 receives inputs for setting a table range and a step value. Specifically, if the user inputs the function expression "f(x)", and presses the "=" key for instructing determination of the key input, and the setting-input receiving unit 102 displays a setting screen for setting the range and step value of a table to be generated, as shown in FIG. 5B, on the display unit 5.

Figure 5C:
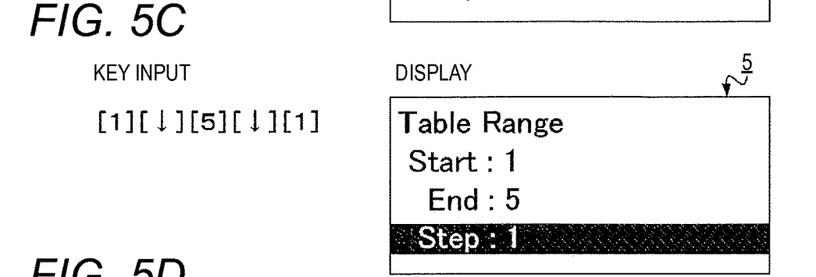

If this input screen for setting a table range and a step value is displayed, for example, in order to generate a table in a range from "1" to "5", the user inputs "1" in a "Start" field where the lower limit value of a table range should be input, and inputs "5" in an "End" field where the upper limit value of a table range should be input. Further, in order to set the step value of the table to "1", the user inputs "1" in a "Step" field where a step value should be input. The term "step value" means a value representing the interval between values in the range set for a table to be generated. As the result of the settings, the values are input in the individual fields of the setting screen as shown in FIG. 5C.

Figures 5D, 5E:
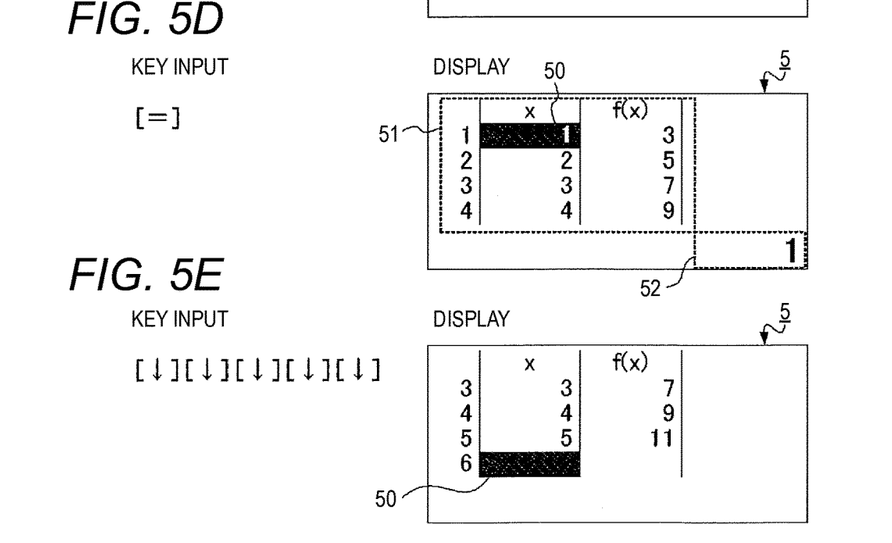

If the table range setting input is received, in STEP S3, the table generating unit 103 generates a table, and displays the table on the display unit 5. That is, if the user sets a table range as shown in FIG. 5C, and presses the "=" key, the table generating unit 103 generates a table as shown in FIG. 5D, and displays the table in a table display area 51 of the display screen of the display unit 5.

Specifically, the table generating unit 103 determines x values "1", "2", "3", "4", and "5" at intervals of "1" which is the set step value in the set range from "1" to "5", and inputs the determined x values in the first to fifth rows of an x-value display column (hereinafter, referred to as the "x column") of a table having the x column and a "f(x)" value display column (hereinafter, also referred to as the "f(x)" column). Further, the table generating unit 103 calculates values "3", "5", "7", "9", and "11" corresponding to the x values "1", "2", "3", "4", and "5" by the input function expression "f(x)=2x+1", and inputs the corresponding values in the first to fifth rows of the "f(x)" column. Then, the table generating unit 103 displays the table generated in the above described way, on the display unit 5 as shown in FIG. 5D.

Also, in a state where the generated table is displayed in the table display area 51, the display unit 5 displays a value pointed by a cursor 50, in a cursor value display area 52 set at a lower right portion of the screen. For example, in a case where the x value "1" of the x column is pointed by the cursor 50 (monochromically reversed in FIG. 5D) as shown in FIG. 5D, the display unit 5 displays the value "1" in the cursor value display area 52.

If the table is generated and displayed, subsequently, in STEP S4, the CPU 7 determines whether any cursor key of the key input unit 4 has been operated. If any cursor key is operated ("YES" in STEP S4), in STEP S5, the CPU 7 moves the cursor 50 according to that operation. Thereafter, the CPU 7 returns the process to STEP S4 in which the CPU re-determines whether any cursor key has been operated.

For example, in a state where the cursor 50 is pointing the value "1" displayed in the first row of the x column as shown in FIG. 5D, if the user presses a cursor key indicating the downward direction, five times, the cursor 50 moves downward by five rows, thereby reaching the sixth row where any x value has not been input, as shown in FIG. 5E. Like this, according to a cursor key input, the CPU 7 moves the cursor 50 to a row where there is an x value displayed or a row where there is no x value displayed.

In a case where any cursor key has not been operated ("NO" in STEP S4), in STEP S6, the CPU 7 determines whether any additional-value input has been received. If it is determined that an input of an additional value has been received ("YES" in STEP S6), in STEP S7, the additional-value input receiving unit 104 displays the input additional value.

Figure 6A:
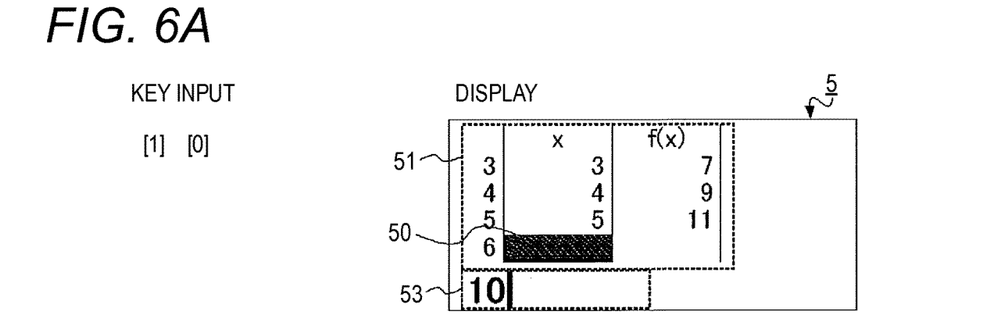
FIGS. 6A to 6D are views illustrating key inputs and the display contents of the display unit according to the key inputs.

For example, in a state where the cursor has been set on the sixth row of the table where there is no x value displayed as shown in FIG. 6A, if the user sequentially presses the "1" and "0" keys of the key input unit 4, the additional-value input receiving unit 104 displays a number "10" in an input-value display area 53 set below the table display area 51 of the display screen of the display unit 5.

Like this, if the additional-value input receiving unit 104 receives an input of an additional value being beyond the range from "1" to "5" set by the setting inputs received by the setting-input receiving unit 102 while the display unit 5 is displaying the table generated by the table generating unit 103, the input additional value is displayed in the input-value display area 53 of the display unit 5.

If the additional-value input receiving unit 104 receives the additional-value input, in STEP S8, the table addition unit 105 determines whether the "=" key of the key input unit 4 has been operated. In a case where the "=" key has not been operated ("NO" in STEP S8), the table addition unit 105 keeps the process at STEP S8, and waits an operation on the "=" key to be received.

If the "=" key is operated ("YES" in STEP S8), in STEP S9, the table addition unit 105 determines whether the cursor 50 is on the x column. In a case where the cursor 50 is not on the x column ("NO" in STEP S9), the table addition unit 105 does not perform any process.

In a case where the cursor 50 is on the x column ("YES" in STEP S9), in STEP S10, the table addition unit 105 adds the input additional value to the location of the cursor, and calculates the value of "f(x)". Thereafter, the table addition unit 105 updates the table with the input additional value and the calculated value of "f(x)", and displays the updated table, in STEP 511, and then moves the cursor 50 to the next lower row in STEP S12.

Figure 6B:
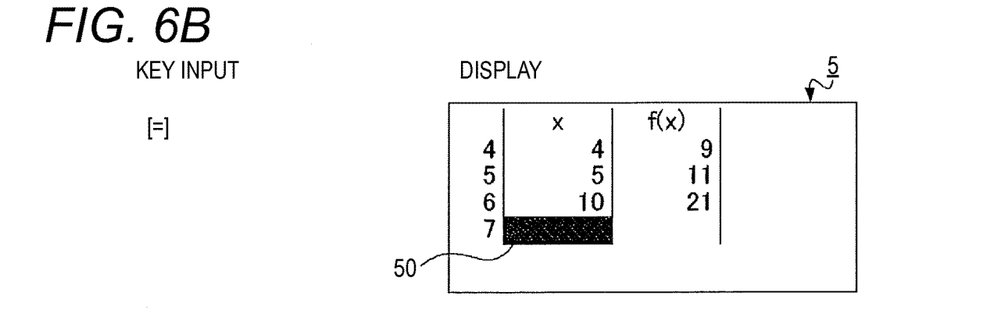

For example, in a case where an input of an additional value "10" is received in a state where the cursor 50 is set on the sixth row of the x column as shown in FIG. 6A, the table addition unit 105 adds the input additional value "10" in the sixth row of the x column where the cursor 50 is set, as shown in FIG. 6B. Further, the table addition unit 105 calculates a value "21" corresponding to the additional value "10" by the input function expression "f(x)=2x+1", and adds the corresponding value "21" in the sixth row of the "f(x)" column. If the table updated by adding the new row as described above is displayed on the display unit 5, the table addition unit 105 automatically moves the cursor 50 to the next seventh row of the x column.

Thereafter, the CPU 7 returns the process to STEP S4 in which the CPU waits for various inputs. In a case where it is determined in STEP S4 that any cursor key has not been operated ("NO" in STEP S4), and it is determined that any additional-value input has not been received ("NO" in STEP S6), the process of the CPU 7 transitions to the process of the flow chart shown in FIG. 4.

In a case where any cursor key has not been operated and any additional-value input has not been received, in STEP S13, the CPU 7 determines whether the "+" or "=" key of the key input unit 4 has been operated. If an operation on the "+" or "=" key is received ("YES" in STEP S13), in STEP S14, the CPU 7 determines whether the current state is a state after an additional-value input.

A case where the current state is a state after an additional-value input means, for example, a case where the current state is a state where the additional value "10" has been input in the sixth row of the x column and the cursor 50 is located at the seventh row which is the next row of the row where the additional value "10" has been input, as shown in FIG. 6B. That is, the CPU 7 determines whether the user has pressed the "+" or "=" key after inputting an additional value in the x column, thereby adding a new row.

In a case where the current state is not a state after an additional-value input ("NO" in STEP S14), the CPU 7 does not perform any process. That is, in a state which is not after any additional-value input, even if the "+" or "=" key is operated, the CPU 7 does not act as the table expansion unit 106 for performing the subsequent processes of STEPS S15 to S17.

If an operation on the "+" or "=" key is received when the current state is a state after an additional-value input ("YES" in STEP S14), in STEP S15, the table expansion unit 106 adds the sum of the x value of the upper row and the step value, to the location of the cursor, and calculates the value of "f(x)". Thereafter, the table expansion unit 106 updates the table with the added additional value and the calculated value of "f(x)", and displays the updated table, in STEP S16, and then moves the cursor 50 to the lower row in STEP S17.

Figure 6C:
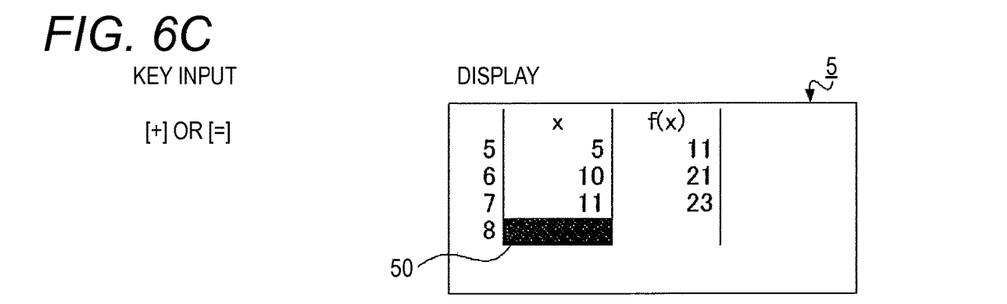

For example, in a case where an input of the "+" or "=" key is received when the cursor 50 is located at the seventh row of the x column as shown in FIG. 6B, the table expansion unit 106 adds the sum "11" of the step value "1" and the additional value "10" input to the sixth row immediately above the location of the cursor 50, in the seventh row where the cursor 50 is located, as shown in FIG. 6C. Further, the table expansion unit 106 calculates a value "23" corresponding to the added x value "11" by the input function expression "f(x)=2x+1", and adds the corresponding value in the seventh row of the "f(x)" column. If the table updated by adding the new row is displayed on the display unit 5, the table expansion unit 106 automatically moves the cursor 50 to the next eighth row of the x column.

Thereafter, the CPU 7 returns the process to STEP S4 in which the CPU waits for various inputs. Thereafter, if the "+" or "=" key is operated again in STEP S13 ("YES" in STEP S13), the CPU 7 acts as the table expansion unit 106 to perform the processes of STEPS S14 to S17, thereby adding a new row to the table.

Figure 6D:
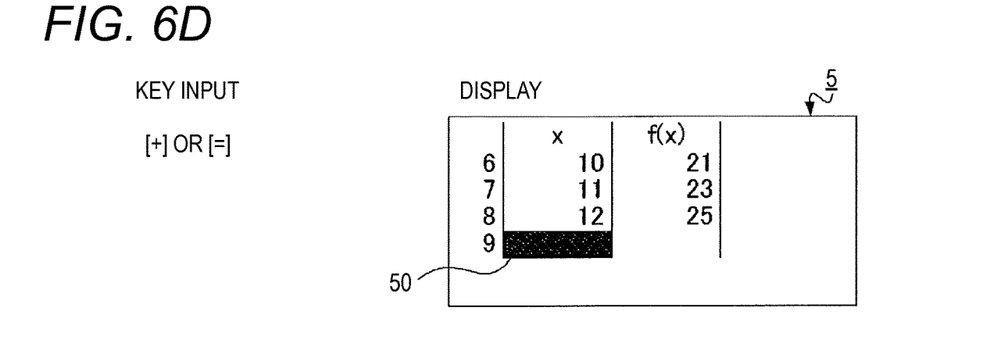

That is, in a case where an input of the "+" or "=" key is received when the cursor 50 is located at the eighth row of the x column as shown in FIG. 6C, the table expansion unit 106 adds the sum "12" of the step value "1" and the additional value "11" input to the seventh row immediately above the location of the cursor 50, in the eighth row where the cursor 50 is located, as shown in FIG. 6D. Further, the table expansion unit 106 calculates a value "25" corresponding to the added x value "12" by the input function expression "f(x)=2x+1", and adds the corresponding value in the eighth row of the "f(x)" column. If the table updated by adding the new row is displayed on the display unit 5, the table expansion unit 106 automatically moves the cursor 50 to the next ninth row of the x column.

As described above, each time the table addition unit 105 adds an additional value and a value corresponding to the additional value, to the table, and then an operation input on the "+" key (the plus key) for instructing addition or the "=" key (the determination key) for instructing determination is received, the table expansion unit 106 adds values obtained by subsequently adding the step value to the additional value, and values corresponding to the obtained values and determined by the input function expression, to the table, in sequence, thereby expanding the table. Therefore, after the table is generated in the range set for the first time, it is possible to easily generate a table having a different range, without returning to the screen for setting a table range and performing resetting.

Meanwhile, in a case where any cursor key has not been operated ("NO" in STEP S4), and any additional-value input has not been received ("NO" in STEP S6), and the "+" or "=" key has not been operated ("NO" in STEP S13), in STEP S18, the CPU 7 determines whether the "−" key has been operated.

In a case where the "−" key has not been operated ("NO" in STEP S18), the CPU 7 performs another process. That is, in a case where an operation other than an operation on a cursor key, an additional-value input, or an operation on the "+", "=", or "−" key is received, the CPU 7 performs a process according to the received operation. For example, in a case where a key for clearing display is operated, the display unit 5 clears the displayed table, and returns to the initial screen for inputting a function expression "f(x)". This process is not shown in the flow charts of FIGS. 3 and 4.

Figure 7A:
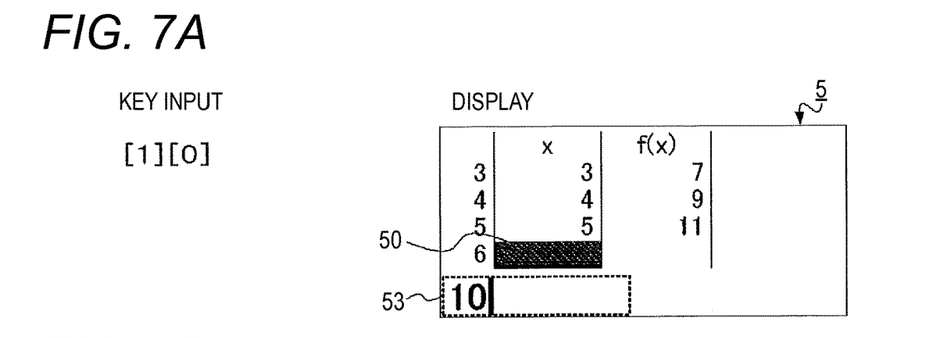
FIGS. 7A to 7D are views illustrating key inputs and the display contents of the display unit according to the key inputs.
Figure 7B:
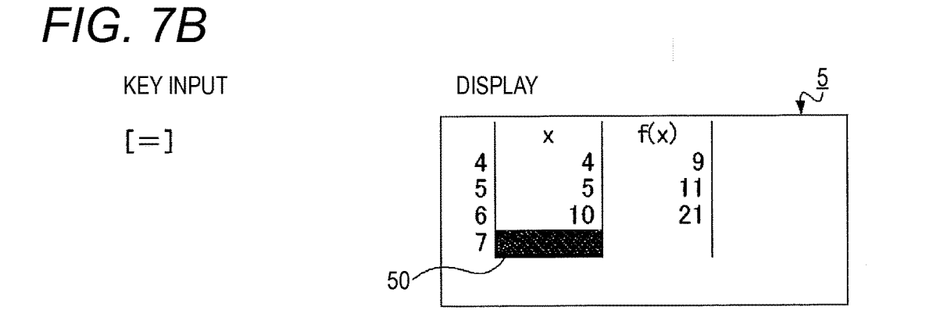

Hereinafter, a process in a case where an operation on the "−" key is received will be described with reference to FIGS. 7A to 7D. Also, in order to facilitate understanding, FIGS. 7A and 7B show the same views as those of FIGS. 6A and 6B, respectively. That is, a process in a case where an input of an additional value "10" is received in a state where the cursor 50 is set at the sixth row of the x column as shown in FIG. 7A, whereby the x value "10" and the value "21" of "f(x)" are added to the sixth row as shown in FIG. 7B, and an operation on the "−" key is received will be described.

If an operation on the "−" key is received ("YES" in STEP S18), in STEP S19, the CPU 7 determines whether the current state is a state after an additional-value input. That is, the CPU 7 determines whether the user has pressed the "−" key, for example, after inputting an additional value "10" to the sixth row of the x column, thereby adding a new row as shown in FIG. 7B.

In a case where the current state is not a state after an additional-value input ("NO" in STEP S19), the CPU 7 does not perform any process. That is, in a state which is not after an additional-value input, even if the "−" key is operated, the CPU 7 does not act as the table expansion unit 106 for performing the subsequent processes of STEPS S20 to S22.

If an operation on the "−" key is received when the current state is a state after an additional-value input ("YES" in STEP S19), in STEP S20, the table expansion unit 106 adds a value obtained by subtracting the step value from the x value of the upper row, to the location of the cursor, and calculates the value of "f(x)". Thereafter, the table expansion unit 106 updates the table with the added additional value and the calculated value of "f(x)", and displays the updated table, in STEP S21, and then moves the cursor 50 to the lower row in STEP S22.

Figure 7C:
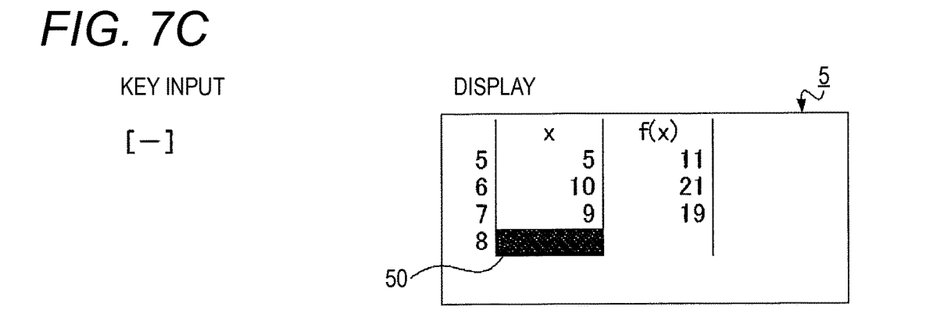

For example, in a case where an input of the "−" key is received when the cursor 50 is located at the seventh row of the x column as shown in FIG. 7B, the table expansion unit 106 adds a value "9" obtained by subtracting the step value "1" from the additional value "10" input in the sixth row immediately above the location of the cursor 50, in the seventh row where the cursor 50 is located, as shown in FIG. 7C. Further, the table expansion unit 106 calculates a value "19" corresponding to the added x value "9" by the input function expression "f(x)=2x+1", and adds the corresponding value in the seventh row of the "f(x)" column. If the table updated by adding the new row is displayed on the display unit 5, the table expansion unit 106 automatically moves the cursor 50 to the next eighth row of the x column.

Thereafter, the CPU 7 returns the process to STEP S4 in which the CPU waits for various inputs. Thereafter, if the "−" key is operated again in STEP S18 ("YES" in STEP S18), the CPU 7 acts as the table expansion unit 106 to perform the processes of STEPS S19 to S22, thereby adding a new row to the table.

Figure 7D:
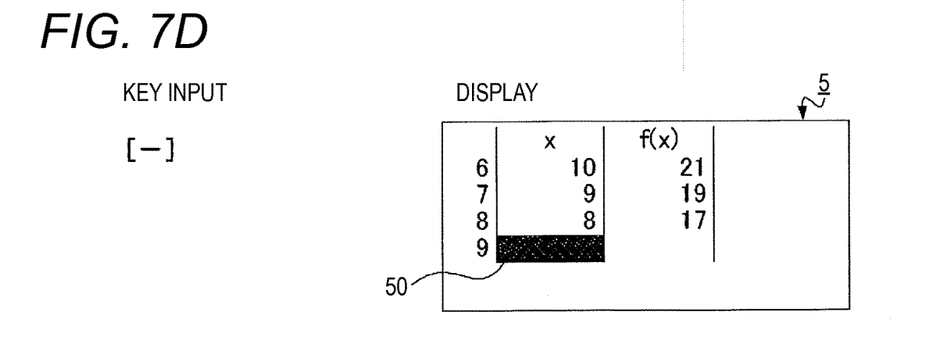

That is, in a case where an input of the "−" key is received when the cursor 50 is located at the eighth row of the x column as shown in FIG. 7C, the table expansion unit 106 adds a value "8" obtained by subtracting the step value "1" from the x value "9" input in the seventh row immediately above the location of the cursor 50, in the eighth row where the cursor 50 is located, as shown in FIG. 7D. Further, the table expansion unit 106 calculates a value "17" corresponding to the added x value "8" by the input function expression "f(x)=2x+1", and adds the corresponding value in the eighth row of the "f(x)" column. If the table updated by adding the new row is displayed on the display unit 5, the table expansion unit 106 automatically moves the cursor 50 to the next ninth row of the x column.

As described above, each time the table addition unit 105 adds an additional value and a value corresponding to the additional value, to the table, and then an operation input on the "−" key (the minus key) for instructing subtraction is received, the table expansion unit 106 adds values obtained by subsequently subtracting the step value from the additional value, and values corresponding to the obtained values and determined by the input function expression, to the table, in sequence, thereby expanding the table. Therefore, after the table is generated in the range set for the first time, it is possible to easily generate a table having a different range, without returning to the screen for setting a table range and performing resetting.

As described above, if the additional-value input receiving unit 104 receives an input of an additional value being beyond the range set by the setting inputs received by the setting-input receiving unit 102 while the display unit 5 is displaying the table generated by the table generating unit 103, the table generating apparatus 100 according to the present embodiment adds the input additional value and a value corresponding to the additional value and determined by the function expression "f(x)", to the table which the display unit 5 is displaying. Further, each time the table addition unit 105 adds an additional value and its corresponding value to the table, and then a predetermined operation input on the "+", "=", or "−" key is received, the table generating apparatus 100 adds values obtained by subsequently changing the additional value, and values corresponding to the obtained values and determined by the function expression "f(x)", to the table which the display unit 5 is displaying, thereby expanding the table.

As a result, if a table is generated once and is displayed on the display unit 5, it is possible to easily expand the table as it is, without returning to the range setting screen and performing resetting, and thus it is possible to improve convenience for the user.

Also, since the table generating apparatus 100 according to the present embodiment has the function of expanding a table by subtracting a step value from an additional value each time the "−" key is operated, in addition to the function of expanding a table by adding a step value to an additional value each time the "+" or "=" key is operated, it is possible to expand a table toward the larger or smaller side with respect to an additional value. Therefore, the user can easily examine and analyze the features of the input function expression "f(x)" in the vicinity of an additional value.

Also, in the above description, while the display unit 5 is displaying the table generated by the table generating unit 103, the additional-value input receiving unit 104 receives an input of an additional value to a location where there is not x value (specifically, the sixth row other than the first to fifth rows where there are the x values displayed), in the table which the display unit 5 is displaying. Further, in a case where an input of an additional value to a location where there is no x value displayed, the table addition unit 105 adds the additional value, and a value corresponding to the additional value and determined by the function expression "f(x)=2x+1", to the location where there is no value displayed (specifically, the sixth or subsequent row), in the table which the display unit 5 is displaying. That is, the table addition unit 105 adds a new x value and a corresponding value of "f(x)" to the table while keeping display of the individual x values and the corresponding values of "f(x)" already included in the table. Therefore, the user can simultaneously analyze the features of the function expression "f(x)" in two different ranges.

Meanwhile, while the display unit 5 is displaying the table generated by the table generating unit 103, the table generating apparatus 100 according to the present embodiment can receive an input of an additional value to a location where there is an x value displayed, in the table which the display unit 5 is displaying. Hereinafter, this case will be described with reference to FIGS. 8A to 8D.

Figure 8A:
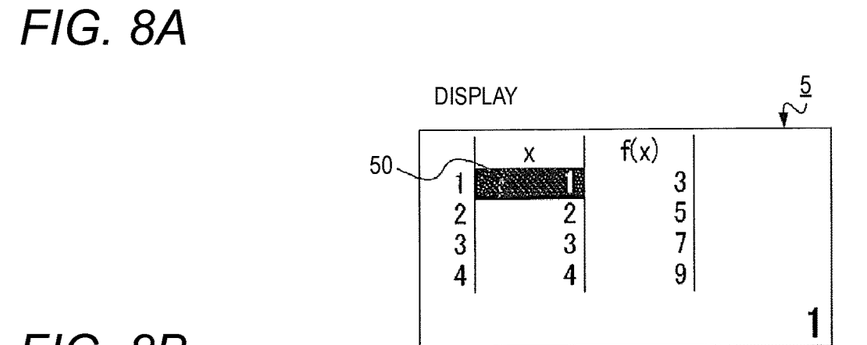
FIGS. 8A to 8D are views illustrating key inputs and the display contents of the display unit according to the key inputs.

FIG. 8A shows the same view as that of FIG. 5D. That is, the table generating unit 103 generates the table having x values "1", "2", "3", "4", and "5" in the first to fifth rows of the x column and having the corresponding values "3", "5", "7", "9", and "11" of "f(x)", and displays the table on the display unit 5. Also, the cursor 50 is pointing the x value "1" of the x column.

In this state, the additional-value input receiving unit 104 receives an input of an additional value to a location where there is an x value displayed, in the table which the display unit 5 is displaying. In the case of receiving an input of an additional value to a location where there is an x value displayed, the table addition unit 105 overwrites the value displayed at the location where the input of the additional value has been received, and its corresponding value, with the additional value and a value corresponding to the additional value and determined by the function expression "f(x)", respectively, thereby adding the additional value and the corresponding value of the additional value to the table.

Figure 8B:
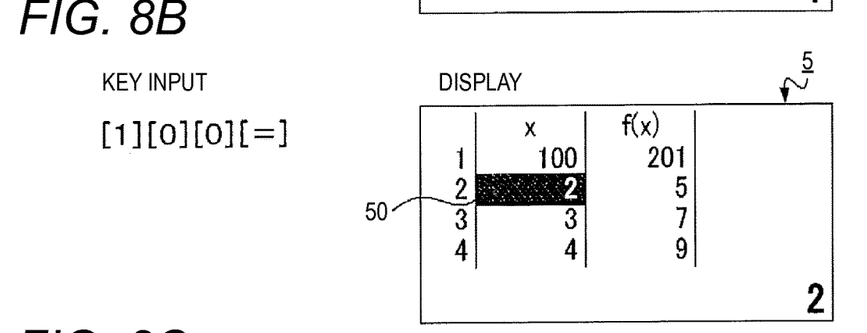

Specifically, if the user sequentially presses the "1", "0", "0", and "=" keys of the key input unit 4 in a state where the cursor 50 is located at the first row of the table where the x value "1" is being displayed as shown in FIG. 8A, the table addition unit 105 overwrites the x value "1" of the first row where the cursor 50 is located, with the input additional value "100", and calculates a corresponding value "201" by the input function expression "f(x)=2x+1", and overwrites the value "3" of "f(x)" of the first row, with the calculated corresponding value "201", as shown in FIG. 8B. If the additional value and its corresponding value are added to the table as described above, the table addition unit 105 moves the cursor 50 to the lower row, that is, the second row.

Subsequently, if any one of "+", "=", or "−" key is operated, similarly in the processes of STEPS S13 to S22, the table expansion unit 106 adds values obtained by subsequently changing the additional value at intervals of the step value, and values corresponding to the obtained values and determined by the function expression "f(x)", to the table which the display unit 5 is displaying, thereby expanding the table.

Figure 8C:
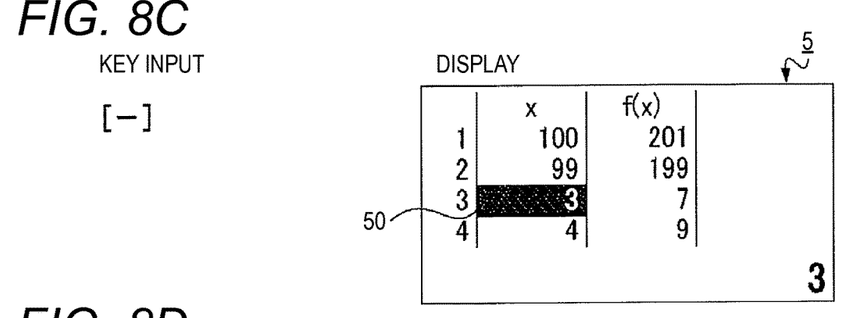

As an example, in a case of receiving an input of the "−" key in a state where the cursor 50 is located at the second row of the x column as shown in FIG. 8B, the table expansion unit 106 overwrites the value "2" of the second row where the cursor 50 is located, with a value "99" obtained by subtracting the step value "1" from the additional value "100" input in the first row immediately above the location of the cursor 50, as shown in FIG. 8C. Further, the table expansion unit 106 calculates a value "199" corresponding to the overwritten x value "99" by the input function expression "f(x)=2x+1", and overwrites the value "5" of the second row of the "f(x)" column with the calculated value "199". If the table overwritten with the new values is displayed on the display unit 5, the table expansion unit 106 automatically moves the cursor 50 to the next third row of the x column.

Figure 8D:
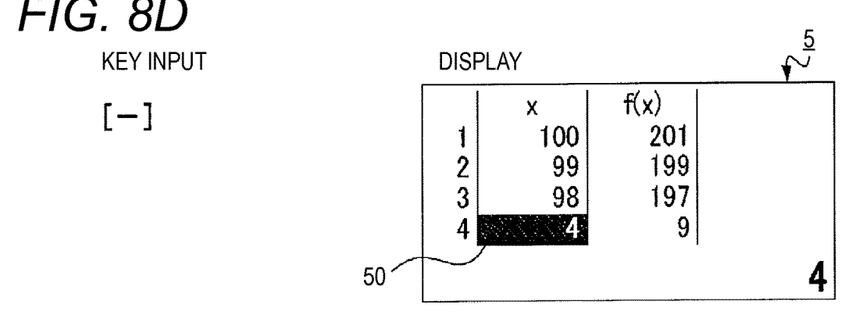

Similarly, in a case of receiving an input of the "−" key in a state where the cursor 50 is located at the third row of the x column as shown in FIG. 8C, the table expansion unit 106 overwrites the value "3" of the third row where the cursor 50 is located, with a value "98" obtained by subtracting the step value "1" from the additional value "99" input in the second row immediately above the location of the cursor 50, as shown in FIG. 8D. Further, the table expansion unit 106 calculates a value "197" corresponding to the overwritten x value "98" by the input function expression "f(x)=2x+1", and overwrites the value "7" of the third row of the "f(x)" column with the calculated value "197". If the table overwritten with the new values is displayed on the display unit 5, the table expansion unit 106 automatically moves the cursor 50 to the next fourth row of the x column.

As described above, the table generating apparatus 100 according to the present embodiment receives an input of an additional value to any one location of a location where there is no x value displayed and a location where there is an x value, in the table which the display unit 5 is displaying. Thereafter, with reference to the location where the input of the additional value has been received, each time an operation input on the "+", "=", or "−" key is received, the table generating apparatus 100 successively expands the table. The user can generate a table of different ranges at desired positions, and can change the generated table, and thus the convenience of the table display area 51 is improved.

Although the embodiment of the present invention has been described above, the above described embodiment is illustrative, and the application range of the present invention is not limited thereto. That is, the embodiment of the present invention can be modified in various forms, and every modification is included in the scope of the present invention.

Also, it is possible to provide a configuration for realizing the functions according to the present invention to a table generating apparatus provided in advance, and it is also possible to cause an existing device such as a personal computer or an information terminal device to function as the table generating apparatus according to the present invention by applying a program. In other words, it is possible to cause an existing device such as a personal computer or an information terminal device to function as the table generating apparatus according to the present invention by applying a program for implementing the individual functional components of the table generating apparatus 100 exemplified in the above described embodiment so as to be executable by a CPU or the like controlling the existing device. Also, a table generating method according to the present invention can be carried out by the table generating apparatus.

Also, a method of applying that program is arbitrary. For example, the program can be stored in a computer-readable recording medium (such as a compact disc read-only memory (CD-ROM), a digital versatile disc (DVD), or a magneto optical disc (MO)), and be applied. Alternatively, the program can be stored in storage on a network such as the Internet and be downloaded to be applied.

Although the preferred embodiment of the present invention has been described above, the present invention is not limited to the related specific embodiment, and the present invention includes the scopes of inventions according to the claims and their equivalents.

What is claimed is:

1. A calculator comprising:
   a display;
   an input section having at least a first key for instructing addition and a second key for instructing subtraction;
   a memory having a program stored thereon; and
   a processor which, under control of the program stored in the memory, is configured to:
   display, on the display, a table that includes at least one value that is within a range set by a table range setting and at least one corresponding value acquired by using the at least one value and a function expression;
   upon receiving at least one designation operation, designate a row within the table; and
   regardless of whether or not any value is input in the designated row,
      (i) upon accepting a first key operation input to the first key,
         acquire a first value by adding a step value set by a step value setting to a value displayed in a row immediately above the designated row, and
         display, on the display, a first updated table that includes the acquired first value and a corresponding first value acquired by using the first value and the function expression, the acquired first value and the acquired corresponding first value being located at a row of the first updated table corresponding to the designated row of the table, and
      (ii) upon accepting a second key operation input to the second key,
         acquire a second value by subtracting the step value set by the step value setting from the value displayed in the row immediately above the designated row, and
         display, on the display, a second updated table that includes the acquired second value and a corresponding second value acquired by using the second value and the function expression, the acquired second value and the acquired corresponding second value being located at a row of the second updated table corresponding to the designated row of the table.

2. The calculator according to claim 1, wherein the processor, under control of the program stored in the memory, is further configured to:
   when any value is input in the designated row,
      (i) upon accepting the first key operation, display, on the display, the first updated table where the any value input in the designated row of the table is replaced with at least the acquired first value, and
      (ii) upon accepting the second key operation, display, on the display, the second updated table where the any value input in the designated row of the table is replaced with at least the acquired second value.

3. The calculator according to claim 1, wherein the processor, under control of the program stored in the memory, is further configured to:
   upon accepting the first key operation, display, on the display, the first updated table in which a row immediately below the corresponding row is automatically designated and displayed in a distinctive way from other rows in the first updated table, and
   upon accepting the second key operation, display, on the display, the second updated table in which a row immediately below the corresponding row is automatically designated and displayed in a distinctive way from other rows in the second updated table.

4. The calculator according to claim 3, wherein the processor, under control of the program stored in the memory, is further configured to:
   accept another first key operation input to the first key or another second key operation input to the second key after displaying the first updated table or the second updated table on the display, and
   upon accepting one of the another first key operation and the another second key operation, conduct a corresponding one of displaying processes of:
      (i) upon accepting the another first key operation, displaying, on the display, another first updated table that includes another first value acquired by adding the step value to the acquired first value or the acquired second value, and another corresponding first value acquired by using the another first value and the function expression, the acquired another first value and the acquired another corresponding first value being located at a row of the another first updated table corresponding to the designated row of the first updated table or the second updated table, and
      (ii) upon accepting the another second key operation, displaying, on the display, another second updated table that includes another second value acquired by subtracting the step value from the acquired first value or the acquired second value, and another corresponding second value acquired by using the another second value and the function expression, the acquired another second value and the acquired another corresponding second value being located at a row of the another second updated table corresponding to the designated row of the first updated table or the second updated table.

5. The calculator according to claim 1, wherein the processor, under control of the program stored in the memory, is further configured to:
   upon accepting an input operation of a value into the designated row of the table, regardless of whether or not any value is input in the designated row, display, on the display, a third updated table that includes the accepted input value and a corresponding third value acquired by using the accepted input value and the function expression, the accepted input value and the acquired corresponding third value being located at a row of the third updated table corresponding to the designated row of the table.

6. The calculator according to claim 5, wherein the processor, under control of the program stored in the memory, is further configured to:
   upon accepting the input operation of the value into the designated row of the table, display, on the display, the third updated table in which a row immediately below the corresponding row is automatically designated and displayed in a distinctive way from other rows in the third updated table.

7. The calculator according to claim 6, wherein the processor, under control of the program stored in the memory, is further configured to:
accept another first key operation input to the first key or another second key operation input to the second key after displaying the first updated table or the second updated table on the display,
upon accepting one of the another first key operation and the another second key operation, conduct a corresponding one of displaying processes of:
(i) upon accepting the another first key operation, displaying, on the display, another first updated table that includes another first value acquired by adding the step value to the accepted input value, and another corresponding first value acquired by using the accepted input value and the function expression, the acquired another first value and the acquired another corresponding first value being located at a row of the another first updated table corresponding to the designated row of the third updated table, and
(ii) upon accepting the another second key operation, displaying, on the display, another second updated table that includes another second value acquired by subtracting the step value from the accepted input value, and another corresponding second value acquired by using the accepted input value and the function expression, the acquired another second value and the acquired another corresponding second value being located at a row of the another second updated table corresponding to the designated row of the third updated table.

8. A calculator comprising:
a display;
an input section having at least a first key for instructing addition and a second key for instructing subtraction;
a memory having a program stored thereon; and
a processor which, under control of the program stored in the memory, is configured to:
display, on the display, a table that includes at least one value that is within a range set by a table range setting and at least one corresponding value acquired by using the at least one value and a function expression;
upon receiving at least one designation operation, designate a row within the table; and
when any value is input in the designated row,
(i) upon accepting a first key operation input to the first key,
acquire a first value by adding a step value set by a step value setting to a value displayed in a row immediately above the designated row, and
display, on the display, a first updated table where the any value input in the designated row of the table is replaced with at least the acquired first value, and
(ii) upon accepting a second key operation input to the second key,
acquire a second value by subtracting the step value set by the step value setting from the value displayed in the row immediately above the designated row, and
display, on the display, a second updated table where the any value input in the designated row of the table is replaced with at least the acquired second value.

9. A method executed by a processor of a calculator under control of a program stored in a memory, the calculator further comprising a display and an input section having at least a first key for instructing addition and a second key for instructing subtraction, and the method comprising:
displaying, on the display, a table that includes at least one value that is within a range set by a table range setting and at least one corresponding value acquired by using the at least one value and a function expression;
upon receiving at least one designation operation, designating a row within the table; and
regardless of whether or not any value is input in the designated row,
(i) upon accepting a first key operation input to the first key,
acquiring a first value by adding a step value set by a step value setting to a value displayed in a row immediately above the designated row, and
displaying, on the display, a first updated table that includes the acquired first value and a corresponding first value acquired by using the first value and the function expression, the acquired first value and the acquired corresponding first value being located at a row of the first updated table corresponding to the designated row of the table, and
(ii) upon accepting a second key operation input to the second key,
acquiring a second value by subtracting the step value set by the step value setting from the value displayed in the row immediately above the designated row, and
displaying, on the display, a second updated table that includes the acquired second value and a corresponding second value acquired by using the second value and the function expression, the acquired second value and the acquired corresponding second value being located at a row of the second updated table corresponding to the designated row of the table.

10. A method executed by a processor of a calculator under control of a program stored in a memory, the calculator further comprising a display and an input section having at least a first key for instructing addition and a second key for instructing subtraction, and the method comprising:
displaying, on the display, a table that includes at least one value that is within a range set by a table range setting and at least one corresponding value acquired by using the at least one value and a function expression;
upon receiving at least one designation operation, designating a row within the table; and
when any value is input in the designated row,
(i) upon accepting a first key operation input to the first key,
acquiring a first value by adding a step value set by a step value setting to a value displayed in a row immediately above the designated row, and
displaying, on the display, a first updated table where the any value input in the designated row of the table is replaced with at least the acquired first value, and
(ii) upon accepting a second key operation input to the second key,
acquiring a second value by subtracting the step value set by the step value setting from the value displayed in the row immediately above the designated row, and displaying, on the display, a second updated table where the any value input in the designated row of the table is replaced with at least the acquired second value.

11. A non-transitory computer-readable storage medium having a program stored thereon that is executable by a processor of a calculator, the calculator further comprising a display and an input section having at least a first key for instructing addition and a second key for instructing subtraction, and the program being executable by the processor to control the processor to perform functions comprising:

displaying, on the display, a table that includes at least one value that is within a range set by a table range setting and at least one corresponding value acquired by using the at least one value and a function expression;

upon receiving at least one designation operation, designating a row within the table; and regardless of whether or not any value is input in the designated row,
(i) upon accepting a first key operation input to the first key,
acquiring a first value by adding a step value set by a step value setting to a value displayed in a row immediately above the designated row, and
displaying, on the display, a first updated table that includes the acquired first value and a corresponding first value acquired by using the first value and the function expression, the acquired first value and the acquired corresponding first value being located at a row of the first updated table corresponding to the designated row of the table, and
(ii) upon accepting a second key operation input to the second key,
acquiring a second value by subtracting the step value set by the step value setting from the value displayed in the row immediately above the designated row, and
displaying, on the display, a second updated table that includes the acquired second value and a corresponding second value acquired by using the second value and the function expression, the acquired second value and the acquired corresponding second value being located at a row of the second updated table corresponding to the designated row of the table.

12. A non-transitory computer-readable storage medium having a program stored thereon that is executable by a processor of a calculator, the calculator further comprising a display and an input section having at least a first key for instructing addition and a second key for instructing subtraction, and the program being executable by the processor to control the processor to perform functions comprising:

displaying, on the display, a table that includes at least one value that is within a range set by a table range setting and at least one corresponding value acquired by using the at least one value and a function expression;

upon receiving at least one designation operation, designating a row within the table; and when any value is input in the designated row,
(i) upon accepting a first key operation input to the first key,
acquiring a first value by adding a step value set by a step value setting to a value displayed in a row immediately above the designated row, and
displaying, on the display, a first updated table where the any value input in the designated row of the table is replaced with at least the acquired first value, and
(ii) upon accepting a second key operation input to the second key,
acquiring a second value by subtracting the step value set by the step value setting from the value displayed in the row immediately above the designated row, and
displaying, on the display, a second updated table where the any value input in the designated row of the table is replaced with at least the acquired second value.

\* \* \* \* \*